United States Patent
Liu et al.

(10) Patent No.: US 12,132,557 B2
(45) Date of Patent: Oct. 29, 2024

(54) METHOD AND NETWORK DEVICE FOR SIGNAL RESOURCE CONFIGURATION

(71) Applicant: Telefonaktiebolaget LM Ericsson (publ), Stockholm (SE)

(72) Inventors: Chunhui Liu, Beijing (CN); Qi Zhang, Beijing (CN); Wei Zhou, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 360 days.

(21) Appl. No.: 17/624,722

(22) PCT Filed: Jul. 5, 2019

(86) PCT No.: PCT/CN2019/094786
§ 371 (c)(1),
(2) Date: Jan. 4, 2022

(87) PCT Pub. No.: WO2021/003585
PCT Pub. Date: Jan. 14, 2021

(65) Prior Publication Data
US 2022/0255616 A1    Aug. 11, 2022

(51) Int. Cl.
*H04B 7/08* (2006.01)
*H04B 7/0408* (2017.01)
(Continued)

(52) U.S. Cl.
CPC ............ *H04B 7/088* (2013.01); *H04B 7/0408* (2013.01); *H04B 7/0617* (2013.01); *H04B 7/0626* (2013.01); *H04B 7/0695* (2013.01)

(58) Field of Classification Search
CPC .. H04B 7/0408; H04B 7/0413; H04B 7/0613; H04B 7/0615; H04B 7/0617;
(Continued)

(56) References Cited

U.S. PATENT DOCUMENTS

| 4,192,452 A | * | 3/1980 | Hashimoto | ........ | G06K 7/10871 |
| | | | | | 235/455 |
| 5,633,642 A | * | 5/1997 | Hoss | ................. | B60K 31/0008 |
| | | | | | 342/70 |

(Continued)

FOREIGN PATENT DOCUMENTS

| CN | 102832985 A | 12/2012 |
| CN | 103079217 A | 12/2012 |

(Continued)

OTHER PUBLICATIONS

Sampath, H. et al., "Performance Analysis of Linear Precoding Based on Field Trials Results of MIMO-OFDM System", IEEE Transactions on Wireless Communications, Mar. 2005, pp. 404-409, vol. 4, No. 2.

(Continued)

*Primary Examiner* — Jenee Holland
(74) *Attorney, Agent, or Firm* — Sage Patent Group

(57) ABSTRACT

The present disclosure provides a method at a network device. The method comprises receiving beam information obtained in a plurality of beam management procedures. The beam information comprises information on a plurality of preferred beams of the network device determined by the terminal device in the plurality of beam management procedures. The method further comprises determining speed information of the terminal device based on the beam information obtained in the plurality of beam management procedures. The method further comprises determining a resource configuration of a signal based on the speed information of the terminal device. The signal is a reference signal or a report signal.

18 Claims, 10 Drawing Sheets

(51) Int. Cl.
  *H04B 7/06* (2006.01)
  *H04L 5/00* (2006.01)
  *H04W 16/28* (2009.01)
  *H04W 24/10* (2009.01)
  *H04W 72/51* (2023.01)

(58) Field of Classification Search
  CPC .. H04B 7/0621; H04B 7/0626; H04B 7/0695; H04B 7/0868; H04B 7/0871; H04B 7/088
  See application file for complete search history.

(56) References Cited

U.S. PATENT DOCUMENTS

| | | | |
|---|---|---|---|
| 9,253,650 B2* | 2/2016 | Sahara | H04W 72/046 |
| 10,958,325 B1* | 3/2021 | Park | H04W 88/02 |
| 2006/0052114 A1* | 3/2006 | Cuffaro | G01S 5/02 |
| | | | 455/562.1 |
| 2011/0058505 A1* | 3/2011 | Pan | H04L 5/0048 |
| | | | 370/280 |
| 2011/0279319 A1* | 11/2011 | Takano | H04B 7/0619 |
| | | | 342/367 |
| 2012/0046060 A1* | 2/2012 | Katayama | H04L 5/0037 |
| | | | 455/513 |
| 2014/0099962 A1* | 4/2014 | Capdevielle | H04W 52/38 |
| | | | 455/441 |
| 2014/0323144 A1* | 10/2014 | Kim | H04B 7/0617 |
| | | | 455/562.1 |
| 2014/0349658 A1 | 11/2014 | Lin et al. | |
| 2016/0100393 A1* | 4/2016 | Takashima | H04W 72/51 |
| | | | 370/329 |
| 2016/0190707 A1* | 6/2016 | Park | H01Q 3/24 |
| | | | 370/329 |
| 2016/0192332 A1* | 6/2016 | Koorapaty | H04W 72/21 |
| | | | 370/329 |
| 2016/0366697 A1* | 12/2016 | Andersson | H04L 5/0051 |
| 2017/0006539 A1 | 1/2017 | Kakishima et al. | |
| 2017/0215078 A1* | 7/2017 | Mochizuki | H04W 4/90 |
| 2017/0338923 A1* | 11/2017 | Prasad | H04W 36/0085 |
| 2018/0062711 A1* | 3/2018 | Mizusawa | H04B 7/0452 |
| 2018/0310297 A1* | 10/2018 | Martin | H04W 4/70 |
| 2019/0109689 A1 | 4/2019 | Huang et al. | |
| 2019/0116461 A1* | 4/2019 | Callender | H04W 36/0088 |
| 2019/0123803 A1* | 4/2019 | Raghavan | H04B 17/318 |
| 2019/0207733 A1* | 7/2019 | Tang | H04L 5/006 |
| 2019/0222364 A1 | 7/2019 | Shimoda et al. | |
| 2020/0052770 A1* | 2/2020 | Chen | H04L 5/0051 |
| 2020/0169441 A1 | 5/2020 | Xu et al. | |
| 2020/0413362 A1* | 12/2020 | Osawa | H04W 72/046 |

FOREIGN PATENT DOCUMENTS

| | | | |
|---|---|---|---|
| CN | 103024915 A | 4/2013 | |
| WO | 2018061476 A1 | 4/2018 | |
| WO | 2019096239 A1 | 5/2019 | |

OTHER PUBLICATIONS

3rd Generation Partnership Project, "Technical Specification Group Radio Access Network; NR; Radio Resource Control (RRC) protocol specification (Release 15)", 3GPP TS 38.331 V15.1.0, Mar. 2018, pp. 1-267.

3rd Generation Partnership Project, "Technical Specification Group Radio Access Network; NR; Physical layer procedures for data (Release 15)", 3GPP TS 38.214 V15.1.0, Mar. 2018, pp. 1-76.

* cited by examiner

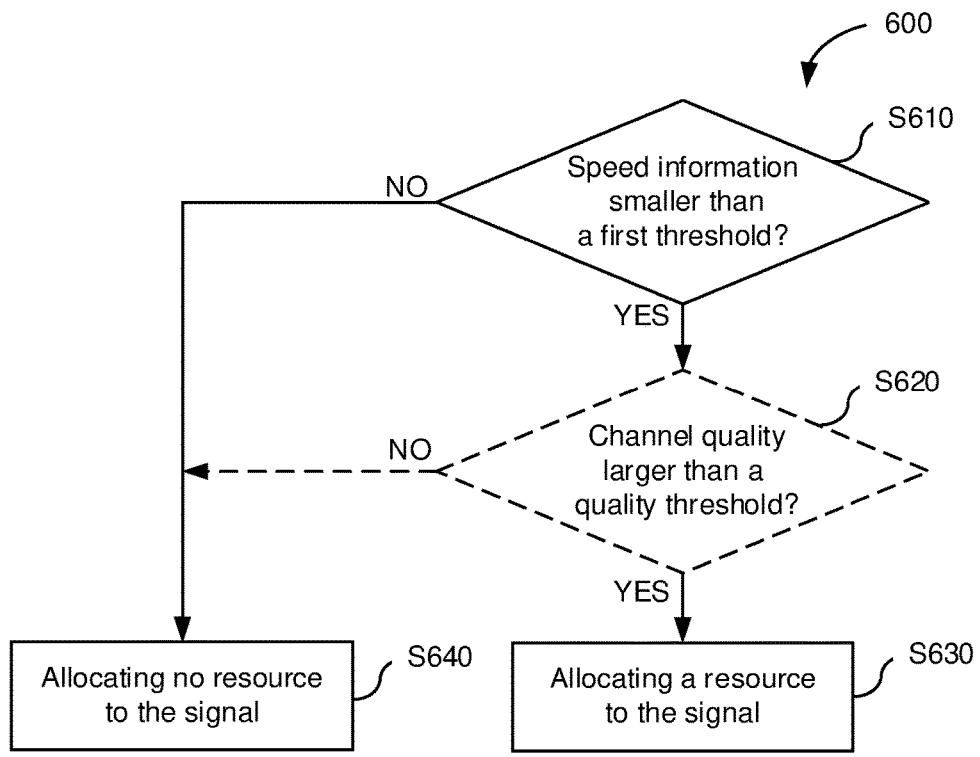

Fig. 6

| Group | Speed information | Example of Speed Information | Resource configuration of the reference signal |
|---|---|---|---|
| High Speed group | Not smaller than the first threshold | ≥ 0.2 beam/ms | Allocating no resource to signal |
| Low speed group 1 | Second range (smaller than the first threshold and not smaller than the second threshold) | 0.1 beam/ms (included) ~ 0.2 beam/ms | Allocating a resource to the signal with the second period (e.g. 20ms) |
| Low speed group 2 | First range (smaller than the second threshold) | < 0.1 beam/ms | Allocating a resource to the signal with the first period (e.g. 40ms) |

Fig. 7

METHOD AND NETWORK DEVICE FOR SIGNAL RESOURCE CONFIGURATION

TECHNICAL FIELD

The present disclosure relates to wireless communications, and more particularly, to a method and a network device for resource configuration of reference signals and/or related reports.

BACKGROUND

Reference signals and related reports are important signals in wireless communications. A first communication device may transmit, to a second communication device through a channel, a reference signal which has been known to the second communication device in advance. The second communication device may measure the received reference signal to obtain information on the channel (e.g. information on channel estimation or channel quality). Alternatively or additionally, the second communication device may also respond to the first communication device with a report including the information on the channel. The reference signals and related reports may thus be useful for transmission or reception of subsequent signals.

Since reference signals and related reports are useful as described in the above, a large amount of reference signals and related reports are configured during communications and therefore have impact on cell throughput.

SUMMARY

It is an object of the present disclosure to provide a method and a network device for resource configuration of reference signal, capable of increasing cell throughput by properly allocating resource to reference signals.

In a first aspect of the present disclosure, a method at a network device is provided. The method includes: receiving beam information obtained in a plurality of beam management procedures, the beam information comprising information on a plurality of preferred beams of the network device determined by the terminal device in the plurality of beam management procedures; determining speed information of the terminal device based on the beam information obtained in the plurality of beam management procedures; and determining a resource configuration of a signal based on the speed information of the terminal device, the signal being a reference signal or a report signal.

In an embodiment, the speed information may be based on distance information between the plurality of preferred beams.

In an embodiment, the distance information between the plurality of preferred beams may be obtained by: determining a plurality of distances, the plurality of distances include beam distances each being a distance between a respective pair of preferred beams obtained in different beam management procedures; and determining a maximum or an average of the plurality of distances as the distance information.

In an embodiment, if a beam distance between a pair of preferred beams is not larger than a predetermined distance, the beam distance between the pair of preferred beams may be determined to be zero.

In an embodiment, the plurality of distances may further include a group distance between a first group of preferred beams determined in a first beam management procedure and a second group of preferred beams determined in a second beam management procedure, the group distance being a beam distance between one preferred beam of the first group and one preferred beam of the second group.

In an embodiment, the group distance may be a maximum of beam distances between preferred beams of the first group and preferred beams of the second group; or the group distance may be a beam distance between a best beam of the preferred beams of the first group and a best beam of the preferred beams of the second group.

In an embodiment, the beam distance between the respective pair of preferred beams may be a number of beams between centers of the preferred beams of the pair.

In an embodiment, the beam distance between the respective pair of preferred beams may be an angle encompassed between centers of the preferred beams of the pair.

In an embodiment, each of the plurality of distances may be a distance normalized by a time interval between preferred beams of the respective beam management procedures.

In an embodiment, the determining a resource configuration of a signal based on the speed information of the terminal device may comprise at least one of the following: allocating a resource to the signal; allocating no resource to the signal; reallocating a resource to the signal; and changing a period for the signal.

In an embodiment, the determining a resource configuration of a signal based on the speed information of the terminal device may comprise: allocating a resource to the signal if the speed information is smaller than a first threshold; or allocating no resource to the signal if the speed information is not smaller than the first threshold.

In an embodiment, the signal comprises a Sounding Reference Signal (SRS) used for uplink code-book-based transmission, the determining a resource configuration of a signal based on the speed information of the terminal device may comprise: allocating a resource to the signal if the speed information is smaller than a first threshold and a channel quality is larger than a quality threshold; or allocating no resource to the signal if the speed information is smaller than the first threshold and the channel quality is not larger than the quality threshold.

In an embodiment, the allocating no resource to the signal may comprise: releasing a resource already allocated to the signal.

In an embodiment, the method may further comprise: in a case where the signal is intended for use with downlink channel reciprocity, setting a downlink transmission mode to a non-reciprocity transmission mode in response to allocating no resource to the signal.

In an embodiment, the method may further comprise: in a case where the signal is intended for use with uplink transmission, setting an uplink transmission mode to a transmission mode which is not based on the signal in response to allocating no resource to the signal.

In an embodiment, the allocating a resource to the signal if the speed information is smaller than a first threshold may comprise: setting a first period for the signal if the speed information is smaller than a second threshold which is smaller than the first threshold; or setting a second period which is smaller than the first period for the signal if the speed information is not smaller than the second threshold and smaller than the first threshold.

In an embodiment, the changing a period for the signal may comprise: decreasing the period for the signal from a first period to a second period which is smaller than the first period in response to determination that the speed information increases to become not smaller than a second threshold; or increasing the period for the signal from the second period to the first period in response to determination that the speed information decreases to become smaller than the second threshold.

In an embodiment, the reallocating a resource to the signal may comprise: reallocating a resource to the signal in response to determination that the speed information increases to become not smaller than a second threshold or in response to determination that the speed information decreases to become smaller than the second threshold.

In an embodiment, the method may further comprise: configuring a detection signal between two successive signals if the period for the signal is larger than a period threshold.

In an embodiment, the method may further comprise: transmitting Channel State Information (CSI)-Reference Signals (CSI-RSs) and/or Synchronization Signal Blocks (SSBs) to the terminal device; receiving respective CSI reports from the terminal device, wherein the beam information comprises beam indexes of the plurality of preferred beams included in the respective CSI reports; transmitting the determined resource configuration of the signal to the terminal device; and receiving the signal transmitted from the terminal device according to the resource configuration of the signal, wherein the signal comprises at least one of a Sounding Reference Signal (SRS) and a CSI report.

In an embodiment, the method may further comprise: transmitting (S810) Channel State Information (CSI)-Reference Signals (CSI-RSs) and/or Synchronization Signal Blocks (SSBs) to the terminal device; receiving (S820) respective CSI reports from the terminal device, wherein the beam information comprises beam indexes of the plurality of preferred beams included in the respective CSI reports; and transmitting (S860) the signal to the terminal device according to the determined resource configuration of the signal, wherein the signal comprises at least one of a CSI-RS, a Sounding Reference Signal (SRS) and an SSB.

In a second aspect of the present disclosure, a network device is provided. The network device comprises a transceiver, a processor and a memory. The memory comprises instructions executable by the processor whereby the network device is operative to perform the method according to the above first aspect.

In a third aspect of the present disclosure, a computer readable storage medium is provided. The computer readable storage medium has computer program instructions stored thereon. The computer program instructions, when executed by a processor in a network device, cause the network device to perform the method according to the above first aspect.

In a fourth aspect of the present disclosure, a computer program is provided. The computer program comprise instructions which, when executed by a processor of a network device, cause the network device to perform the method according to the above first aspect.

With the embodiments of the present disclosure, the cell throughput may be increased without need of additional measurements.

BRIEF DESCRIPTION OF THE DRAWINGS

The above and other objects, features and advantages will be more apparent from the following description of embodiments with reference to the figures, in which:

FIG. 6 is a flowchart illustrating an exemplary process for determining the resource configuration of the signal based on the speed information of the terminal device according to an embodiment of the present disclosure;

FIG. 7 is a table showing an example of the resource configuration of the signal based on the speed information of the terminal device according to an embodiment of the present disclosure;

DETAILED DESCRIPTION

Figure 1:
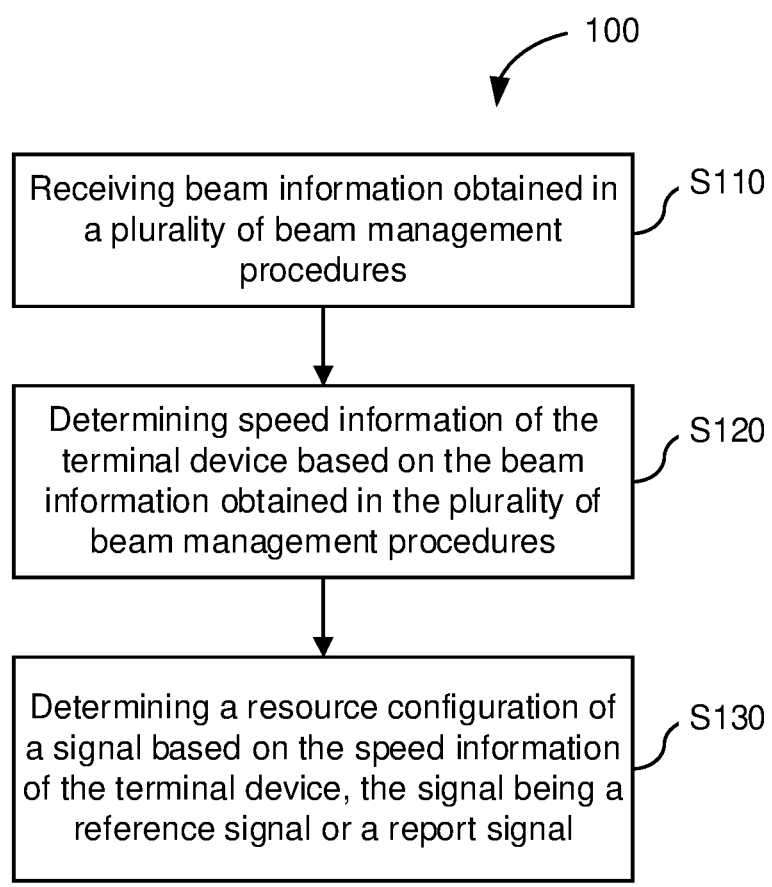
FIG. 1 is a flowchart illustrating an exemplary method for determining resource configuration of a signal according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "wireless communication network" refers to a network following any suitable communication standards, such as NR, LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1G (the first generation), 2G (the second generation), 2.5G, 2.75G, 3G (the third generation), 4G (the fourth generation), 4.5G, 5G (the fifth generation) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device refers to a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, desktop computers, image capture terminal devices such as digital cameras, gaming terminal devices, music storage and playback appliances, a mobile phone, a cellular phone, a smart phone, voice over IP (VoIP) phones, wireless local loop phones, tablets, personal digital assistants (PDAs), wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, "downlink" refers to a transmission from a network device to a terminal device, and "uplink" refers to a transmission in an opposite direction.

References in the specification to "one embodiment", "an embodiment", "an example", "some embodiments" and the like indicate that the embodiment or example described may include a particular feature, structure, or characteristic, but it is not necessary that every embodiment or example includes the particular feature, structure, or characteristic. Moreover, such phrases are not necessarily referring to the same embodiment or example. Further, when a particular feature, structure, or characteristic is described in connection with an embodiment or an example, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

FIG. 1 is a flowchart illustrating an exemplary method 100 for determining resource configuration of a signal according to an embodiment of the present disclosure. The method 100 can be performed at a network device, e.g., an eNB or gNB.

As shown in FIG. 1, the method 100 may comprise a block S110 of receiving beam information obtained in a plurality of beam management procedures. The beam information may comprise information on a plurality of preferred beams of the network device determined by the terminal device in the plurality of beam management procedures. The method 100 may further comprise a block S120 of determining speed information of the terminal device based on the beam information obtained in the plurality of beam management procedures. The method 100 may further comprise a block S130 of determining a resource configuration of a signal based on the speed information of the terminal device. The signal herein can be a reference signal or a report signal (e.g. a report in response to a reference signal).

According to the method 100 illustrated in FIG. 1, since the resource configuration of a reference signal and/or related report can be determined according to the speed information of the terminal device, unnecessary resource allocation may be avoided, so that the cell throughput can be increased. In addition, since the speed information of the terminal device is determined from the beam information obtained in beam management procedures which have already been performed, the determination of the resource configuration may be free of complicated hardware or processing (e.g. a special velocimeter or related algorithms), and the beam management procedures may function not only for determining the beam to be used for transmission but also for obtaining the speed information of the terminal device for use with the determination of the resource configuration.

In the following, each block of the method 100 will be described in more detail with reference to various embodiments shown in FIGS. 2-8.

At block S110, a network device obtains beam information in a plurality of beam management procedures.

Beam management may be used for a communication device to select a beam for transmission or reception to or from another device. It is particularly useful in communication scenarios with high frequencies and narrow beams, in which fine alignment of the highly directional beams will be desirable.

Figure 2:
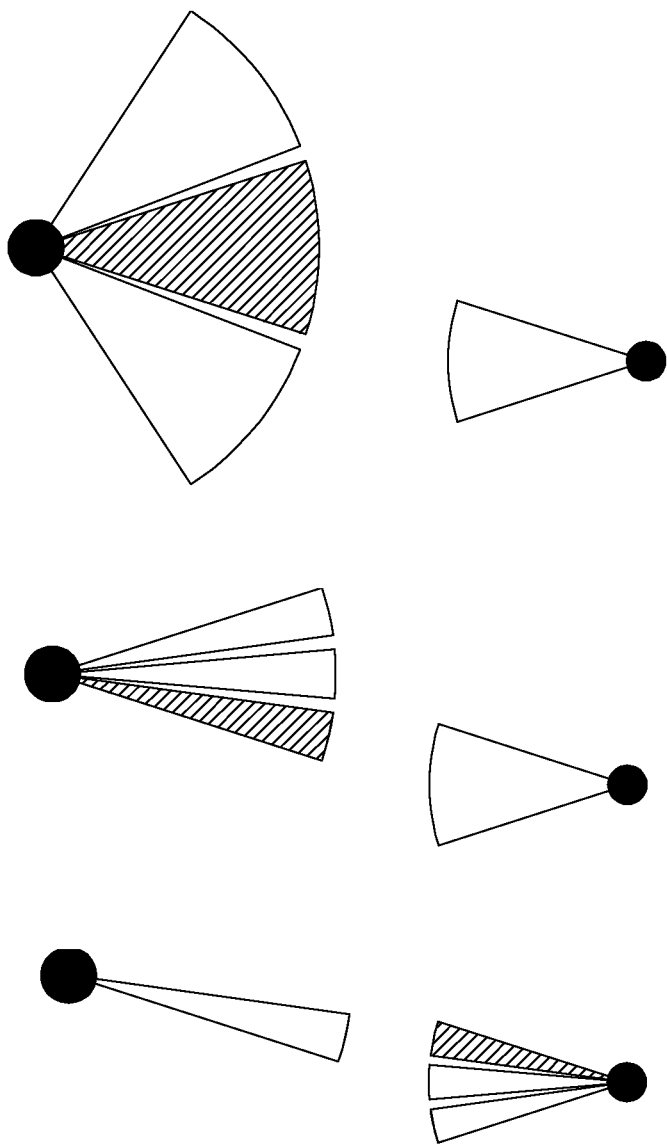
FIG. 2 is a schematic diagram showing an example of a beam management procedure according to an embodiment of the present disclosure.

FIG. 2 is a schematic diagram showing an example of a beam management procedure according to an embodiment of the present disclosure.

According to the example shown, a beam management procedure may comprise three procedures which include:
Procedure P1: an initial beam selection procedure in which the network device initially selects a wide transmission beam;
Procedure P2: a transmission beam refinement procedure in which the network device determines a transmission beam to be used; and
Procedure P3: a reception beam selection procedure in which the terminal device determines a reception beam to be used.

In an example of Procedure P2, the network device transmits a Channel State Information-Reference Signal (CSI-RS) or a Synchronization Signal Block (SSB) to the terminal device through a plurality of beams, and receives a Channel State Information Report (CSI Report) from the terminal device. The CSI Report may include beam information which comprises information on one or more preferred beams. The beam information may include Reference Signal Received Powers (RSRP) of the one or more (e.g. one to four) preferred beams along with beam indexes thereof. The one or more preferred beams may be selected by the terminal device from the plurality of beams according to respective RSRPs of the CSI-RS or SSB (e.g. with the largest RSRPs).

In this way, through a plurality of beam management procedures, beam information may be obtained which includes information on a plurality of preferred beams of the network device determined by the terminal device in the plurality of beam management procedures. For example, the beam information may comprise information on two preferred beams determined in a first beam management procedure, information on one preferred beam determined in a second beam management procedure, and information on four preferred beams determined in a third beam management procedure.

At block S120, the network device determines speed information of the terminal device based on the beam information obtained in the plurality of beam management procedures.

In an example, the speed information may be based on (e.g. comprise) distance information between the plurality of preferred beams determined in the plurality of beam management procedures.

Preferred beams in each beam management procedure reflect the directivity of the terminal device at the time of the beam management procedure. Therefore, distances between preferred beams of different beam management procedures are good indication of how fast the terminal device is moving across different beam coverage areas.

In an example, the distance information between the plurality of preferred beams may be obtained by determining a plurality of distances and determining a maximum or an average of the plurality of distances as the distance information. Here, the plurality of distances may include beam distances. Each of the beam distances may be a distance between a respective pair of preferred beams obtained in different beam management procedures.

Figure 3:
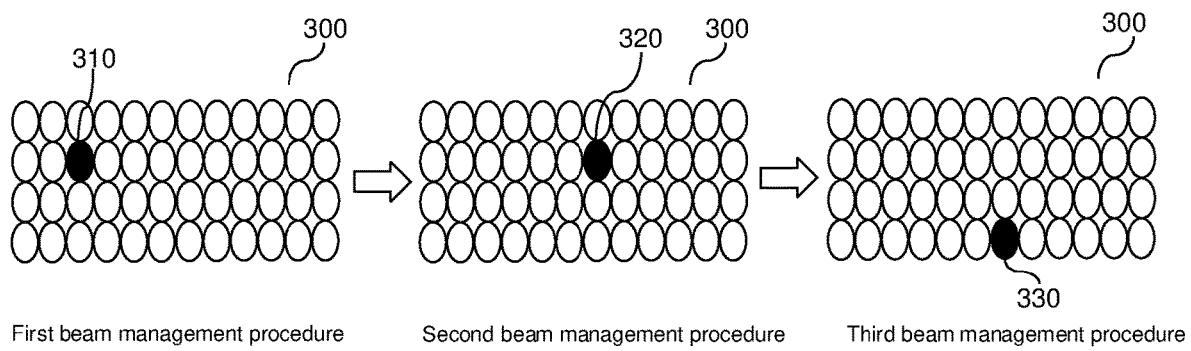
FIGS. 3 to 5 are schematic diagrams showing examples of how speed information of the terminal device can be determined based on beam information according to an embodiment of the present disclosure.

FIG. 3 is a schematic diagram showing an example of how the speed information can be determined based on the beam information according to an embodiment of the present disclosure. For the example of FIG. 3, there are altogether 12×4=48 transmission beams 300 usable by the network device. A preferred beam 310 is determined in a first beam management procedure, a preferred beam 320 is determined in a subsequent second beam management procedure and a preferred beam 330 is determined in a further subsequent third beam management procedure.

In an example, a beam distance between a pair of preferred beams obtained from different beam management procedures may be calculated as a Euclidean distance between centers of the preferred beams.

In an example, the beam distance between the respective pair of preferred beams may be a number of beams between centers of the preferred beams of the pair. For example, a center of a beam may be a center point between the points on the sides of the lobe of the beam where the power has fallen to half (i.e. −3 dB) of its maximum value. For the example of FIG. 3, the beam distance between a pair of preferred beams 310 and 320 may be determined as 7−3=4 beams, the beam distance between a pair of preferred beams 320 and 330 is determined as 4−2=2 beams, and the beam distance between a pair of preferred beams 310 and 330 is determined as $\sqrt{4^2+2^2}=4.47$ beams.

Alternatively, the number of beams may be weighted by a beam width, so that the beam distance between the respective pair of preferred beams may be determined to be an angle encompassed between centers of the preferred beams of the pair. In an example, a half power beam width (HPBW), also known as a beam angle, may be used as the beam width, which is defined as the angle encompassed between the points on the sides of the lobe of the beam where the power has fallen to half (i.e. −3 dB) of its maximum value. In a case where a pair of preferred beams are spaced only in the horizontal direction or only in the vertical direction, the angle encompassed between the centers of the preferred beams of the pair may simply be approximated by a sum of the beam widths of the beams located between the centers of the pair of the preferred beams. For the example of FIG. 3, assuming the beam width is, for example, 10° in horizontal direction and 6° in vertical direction, the beam distance between the pair of preferred beams 310 and 320 may be determined as $(7-3)\times 10°=40°$, and the beam distance between the pair of preferred beams 320 and 330 is determined as $(4-2)\times 6°=12°$. In a case where a pair of preferred beams are spaced not only in the horizontal direction but also in the vertical direction, the angle encompassed between the centers of the preferred beams of the pair may be approximated by an Euclidean distance based on the numbers of beams weighted by the beam widths both in the horizontal direction and in the vertical direction. For the example of FIG. 3, the beam distance between the pair of preferred beams 310 and 330 is determined as $\sqrt{(4\times 10°)^2+(2\times 6°)^2}\approx 42°$.

In determining the distance information, it is possible to take into account only some pairs of preferred beams, which may include the pair of preferred beams 310 and 320 and the pair of the preferred beams 320 and 330 for the example in FIG. 3. Nevertheless, since long-term consideration with less short-term disturbance may also reveal meaningful indication of the speed of the terminal device, all pairs of the preferred beams may be considered, which may further include the pair of preferred beams 310 and 330 for the example in FIG. 3.

If the time intervals between preferred beams of pairs which are used in determining the distance information are fixed, then the absolute beam distance may simply reflect the speed of the terminal device, and therefore the distance information as described in the above may directly function as the speed information. Alternatively, the time interval between preferred beams of respective beam management procedures may also be considered in determining the speed information based on the distance information. In an example, each of the beam distances may be a distance normalized by a time interval between preferred beams of respective beam management procedures. For the example of FIG. 3, assuming the time interval between the preferred beams 310 and 320 is 20 ms and the time interval between the preferred beams 320 and 330 is also 20 ms, then the time-normalized beam distance between the preferred beams 310 and 320 may be calculated as 4/20=0.2 beam/ms (or 40°/20=2°/ms), the time-normalized beam distance between the preferred beams 320 and 330 is 2/20=0.1 beam/ms (or 12°/20=0.6°/ms), and the time-normalized beam distance between the preferred beams 310 and 330 is 4.47/40=0.11 beam/ms (or 42°/40=1.05°/ms).

According to the above examples, the beam distance (and thus the distance information and the speed information) may be determined in terms of a number of beams, an angle encompassed between centers of the preferred beams, a number of beams normalized by a time interval or the angle normalized by a time interval, which may reflect how fast the terminal device moves from one beam coverage area to another with respect to the network device.

In an example, a maximum or an average of the plurality of distances may be determined as the distance information. For the example of FIG. 3, if the beam distance is determined in terms of the time-normalized number of beams, the distance information (the speed information) may be determined to a maximum of the plurality of (time-normalized) distances, namely 0.2 beam/ms, or the average of the plurality of (time-normalized) distances, namely (0.2+0.1+0.11)/3=0.14 beam/ms.

In many cases (especially in Non-Line of Sight (NLOS) scenarios), several beams may result in substantially the same RSRPs in one beam management procedure. In such cases, even if the terminal device only selects one preferred beam in a beam management procedure, the selected preferred beam is not necessarily a predominant beam, but other beams nearby might have similar RSRP. Therefore, even if two different beams which are located close to each other are selected by the terminal device in two different beam management procedures respectively, it is still highly possible that the terminal device has not been moved significantly.

In consideration of the above, the preferred beams which are considered close enough to each other may be defined as a group of preferred beams, and the distance information described in the above may be determined in terms of such groups. The concept of the group may be applied to both the preferred beams determined in different beam management procedures and the preferred beams determined in a same beam management procedure.

In an example, if a beam distance between a pair of preferred beams determined in different beam management procedures is not larger than a predetermined distance (i.e. the pair of preferred beams can be deemed as in a same group of preferred beams), the beam distance between the pair of preferred beams may be determined to be zero. For example, the predetermined distance may be set as a beam distance corresponding to one beam (or 0.05 beam/ms).

It is also possible that more than one preferred beams are selected by the terminal device in one beam management procedure. In this case, it is possible to take all the preferred beams into consideration when determining the beam distances between pairs of preferred beams, as long as any one pair does not include two preferred beams selected in the same beam management procedure. Nevertheless, it is also possible to consider more than one preferred beams located close to each other determined in a same beam management procedure as a group.

More specifically, in an example, the plurality of distances may further include a group distance between a first group of preferred beams determined in a first beam management procedure and a second group of preferred beams determined in a second beam management procedure. The group distance may be determined to be a beam distance between one preferred beam of the first group and one preferred beam of the second group.

For example, the group distance may be determined to be a maximum of the beam distances between preferred beams of the first group and preferred beams of the second group. In another example, the group distance may be determined to be a beam distance between a best beam of the preferred beams of the first group and a best beam of the preferred beams of the second group. The best beam may be a preferred beam which has the highest RSRP among the preferred beams of the group.

Figure 4:
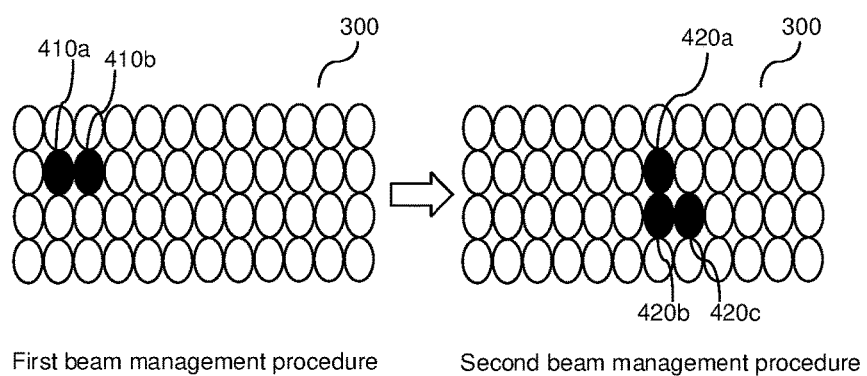

FIG. 4 is a schematic diagram showing an example of how the group distance can be determined based on the beam information according to an embodiment of the present disclosure. As depicted in the example of FIG. 4, since two preferred beams 410a and 410b determined in the first beam management procedure are close to each other, they can be considered as a first group. Similarly, since three preferred beams 420a, 420b and 420c determined in the second beam management procedure are close to each other, they can be considered as a second group. Then the distance between the beams determined in the first and second beam management procedures may be determined as the group distance between the first group and the second group. The group distance between the first group and the second group may be determined to be a maximum distance between the first group and the second group, namely the distance between the preferred beam 410a and the preferred beam 420c. Alternatively, the group distance may be determined to be a distance between a best beam of the first group and a best beam of the second group, for example, the distance between the best beam 410a and the best beam 420b. Similarly to the beam distances, the group distance may also be determined in terms of a number of beams, an angle encompassed between centers of the preferred beams, a number of beams normalized by a time interval or the angle normalized by a time interval.

Figure 5:
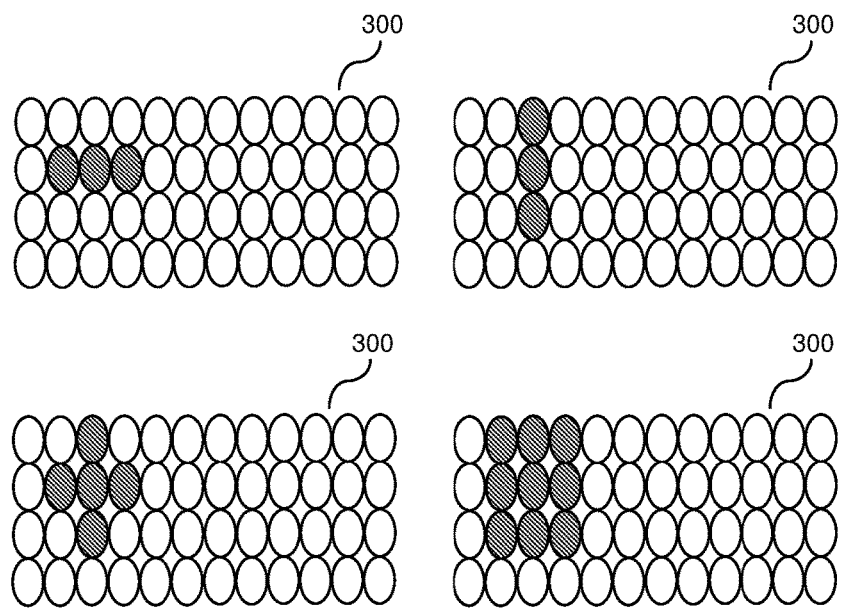

There may be many ways to define the groups of preferred beams which are close to each other. FIG. 5 illustrates some examples of possible groups of preferred beams with shades, in which groups of preferred beams may be defined by the relative distances and/or positional relations. For example, beams between which the distances are not larger than a threshold distance (horizontally and/or vertically) may be considered as in a same group. It will be appreciated that the ways to define the groups of preferred beams are not limited to those shown in FIG. 5, but may vary depending on requirements, specific applications and/or scenarios.

By virtue of defining groups for the preferred beams, preferred beams which are located close to each other may be considered as one beam. In this way, preferred beams that might have similar RSRPs will not impart excessive weight to the determination of the speed information of the terminal device. The effect of NLOS scenario may thus be alleviated.

In an example, the process of block S120 and thus the whole method 100 may be performed periodically every period of time. The period of time may comprise several CSI report periods if the terminal devices served by the network device have the same CSI report period. The period of time may alternatively be set to a fixed time. The period of time may be set depending on requirements of the specific applications and scenarios (for example, how frequently the speed of the terminal device is expected to change).

In some cases, the beam may be large enough, and thus frequent determination of the speed information of the terminal device based on beam information may not be necessary. In this case, not all beam management procedures in the period of time are used for determination of the speed information. For example, only one out of every several beam management procedures may be used for determination of the speed information. In other words, for the example of FIG. 3, there may be other beam management procedures between the first and second beam management procedures.

After determining the speed information of the terminal device, the network device determines, at block S130, a resource configuration of a signal based on the speed information of the terminal device. The signal may be a reference signal or a report in response to a reference signal.

More specifically, the step of block S130 of determining a resource configuration of the signal may comprise at least one of the following: allocating a resource to the signal, allocating no resource to the signal, reallocating a resource to the signal; and changing a period for the signal.

The inventor has found that with different speeds of the terminal device, the reference signals and/or related reports may bring out different levels of benefit. More specifically, the reference signals (e.g. a Sounding Reference Signal (SRS)) and/or related reports are more useful if the terminal device does not move fast across different beam coverage areas. This is because the channel for the reference signal will better resemble the actual communication channels to be used (e.g. a Physical Uplink Shared Channel (PUSCH), a Physical Downlink Shared Channel (PDSCH), a Physical Uplink Control Channel (PUCCH) or a Physical Downlink Control Channel (PDCCH)) if the terminal device does not move fast across different beam coverage areas. When the speed is too high, the preferred beam to be used changes also fast and the channel state changes fast accordingly, and thus the reference signal may not necessarily be able to reflect the channel state to be used at a later time.

In consideration of the above, an exemplary process 600 of block S130 for determining the resource configuration of the signal based on the speed information of the terminal device is proposed and shown in FIG. 6. In the example of FIG. 6, the signal, for which the resource configuration is to be determined, may comprise an uplink or downlink reference signal (e.g. the SRS signal), or a related report thereof.

As shown in FIG. 6, at block S610, it is determined whether the speed information is smaller than a first threshold. If the speed information is smaller than the first threshold, the process proceeds to block S630 at which a resource is allocated to the signal. Otherwise, if the speed information is not smaller than the first threshold, the process proceeds to block S640 at which no resource is allocated to the signal. If the speed information is determined in terms of a number of beams, the threshold is also a number of beams. If the speed information is an angle, the threshold is also an angle. If the speed information is determined with normalization by a time interval, the threshold is also a value normalized by a time interval. The first threshold may be set depending on requirements, specific applications and/or scenarios, and may correspond to a value in the range of, for example but not limited to, 0.1 beam/ms to 0.25 beam/ms.

The inventor also found that when a channel quality between the network device and the terminal device is low, reference signals (e.g. an SRS signal used for uplink codebook-based transmission) might not achieve substantial benefits for the communications.

In consideration of this, an alternative example is proposed and also shown in FIG. 6 in which the process 600 may be performed in further consideration with a channel quality. More specifically, at block S610, it is determined whether the speed information is smaller than a first threshold. If the speed information is smaller than the first threshold, the process proceeds to block S620 at which it is determined whether the channel quality is larger than a quality threshold. If the channel quality is larger than the quality threshold, the process proceeds to block S630 at which a resource is allocated to the signal. Otherwise, if the channel quality is not larger than the quality threshold, the process proceeds to block S640 at which no resource is allocated to the signal. In other words, a resource is allocated to the signal if the speed information is smaller than the first threshold and a channel quality is larger than the quality threshold, or no resource is allocated to the signal if the speed information is smaller than the first threshold and the channel quality is not larger than the quality threshold. The quality threshold may be set depending on requirements, specific applications and/or scenarios.

Among reference signals, SRS signals allow for channel estimation used for scheduling and/or beamforming. In an NR system, The SRS signal has extended use for both downlink and uplink transmissions, and is especially useful in configuring NR uplink transmissions. For example, the SRS signal may be used for uplink codebook-based transmission, uplink non-codebook-based transmission, and uplink beam management in the NR system. In addition, the SRS signal can also be used for downlink reciprocity-based transmission in the NR system.

In the NR system, although a larger bandwidth is provided compared with in an LTE system, the transmission power is still substantially the same or similar to that in the LTE system for terminal devices, and therefore the SRS coverage would become a problem in the NR system. Furthermore, with NR Time Division Duplex (TDD) patterns, uplink time slots are fewer than the downlink time slots, and uplink symbols for SRS configuration are also limited by uplink physical layer processing capability. Therefore, if there are a considerable number of uplink symbols configured for the SRS signals, the uplink cell throughput would be significantly decreased. With this regard, the exemplary process 600 may be particularly useful in increasing the cell throughput by reducing unnecessary cost of the SRS signals.

While the process 600 of FIG. 6 may be implemented before a resource is to be allocated to the reference signal, it may also be useful after a resource has been allocated to the reference signal while the reference signal has not been transmitted yet. More specifically, when it is determined that the speed information becomes not smaller than the first threshold, or alternatively, when it is determined that the speed information is smaller than the first threshold but the channel quality becomes not larger than the quality threshold, if a resource has been allocated to the reference signal, the resource can be released.

In some examples, if no resource is allocated to the reference signal or related report (e.g. allocating no resource at all or releasing an already allocated resource), some fallback schemes may be performed in response to the lack of the reference signal or related report.

In an example, in a case where the signal is intended for use with downlink channel reciprocity (e.g. an SRS signal for use with downlink channel reciprocity), a downlink transmission mode may be set to a non-reciprocity transmission mode in response to allocating no resource to the signal.

In another example, in a case where the signal is intended for use with uplink transmission (e.g. an SRS signal for use with uplink transmission), an uplink transmission mode may be set to a transmission mode which is not based on the signal in response to allocating no resource to the signal.

In addition, the inventor further found that the faster the terminal device moves across different beam coverage areas, the shorter period will be useful for configuring the reference signals. This is because for terminal devices with high speed, the preferred beam might change more frequently and therefore frequent channel measurement and estimation will be preferred, and vice versa.

In consideration of this, an example is proposed in which different periods may be set for the signal based on the speed information of the terminal device if it is decided to allocate the resource to the signal.

In an example, allocating the resource to the signal may comprise: setting a first period for the signal if the speed information is smaller than a second threshold which is smaller than the first threshold; or setting a second period which is smaller than the first period for the signal if the speed information is not smaller than the second threshold and smaller than the first threshold. The second threshold, the first period and the second period may be set depending on requirements, specific applications and/or scenarios. The second threshold may be set to correspond to a value in the range of, for example but not limited to, 0.05 beam/ms to 0.15 beam/ms. The first period may be set to a value in the range of, for example but not limited to, 20 ms to 60 ms. The second period may be set to a value in the range of, for example but not limited to, 10 ms to 40 ms.

Although only two different periods in response to two speed ranges are described in the above, it will be appreciated that more thresholds (and thus more speed ranges) may be set for the speed information, and more different periods may be set in response to the comparison results between the speed information and the thresholds.

In this way, if the speed of the terminal device is relatively low, a longer period may be set for the reference signal and related report. Therefore, a cell throughput may be increased because fewer reference signals and related reports will be transmitted during a given period of time if the terminal device moves not so fast.

FIG. 7 is a table showing an example of the resource configuration of the signal based on the speed information of the terminal device according to an embodiment of the present disclosure.

As shown in FIG. 7, terminal devices may be divided into different groups based on comparison of the speed information with the thresholds. If the speed information of the terminal device falls within a high speed group in which the speed information is not smaller than the first threshold (e.g. 0.2 beam/ms), no resource will be allocated to a reference signal associated with the terminal device. If the speed information of the terminal device is smaller than the first threshold (e.g. 0.2 beam/ms) and not smaller than the second threshold (e.g. 0.1 beam/ms), a resource will be allocated to the reference signal with a second period (e.g. 20 ms). If the speed information of the terminal device is smaller than the second threshold (e.g. 0.1 beam/ms), a resource will be allocated to the reference signal with a first period (e.g. 40 ms) which is longer than the second period.

In an example, a period for the signal may be changed depending on a change of speed of the terminal device. More specifically, the period for the signal may be decreased from the first period to the second period in response to determination that the speed information increases to become not smaller than the second threshold. Similarly, the period for the signal may be increased from the second period to the first period in response to determination that the speed information decreases to become smaller than the second threshold.

If a resource has been allocated to the reference signal but the reference signal has not yet been transmitted using the allocated resource, upon determination that the speed has been changed across the second threshold, the resource can be reallocated before transmission. In other words, a resource may be reallocated to the signal in response to determination that the speed information increases to become not smaller than the second threshold or in response to determination that the speed information decreases to become smaller than the second threshold. For example, in a case where it is determined that the speed information decreases from one not smaller than the second threshold to become smaller than the second threshold, the resource for the signal may be reallocated to later time slots (e.g. corresponding to a longer period). In a case where it is determined that the speed information increases from one smaller than the second threshold to become not smaller than the second threshold, the resource for the signal may be reallocated to earlier time slots (e.g. corresponding to a shorter period).

In an example, for terminal devices which are configured with a long period for the reference signals (e.g. if the period for the reference signal is larger than a period threshold), a detection signal may be configured between two successive reference signals. The detection signal may be aperiodic or has a shorter period. The detection signal may be CSI-RS or an SSB transmitted from the network device to the terminal device. In response to the detection signal, a CSI report may be transmitted from the terminal device to the network device. With this detection signal, even if the period for the reference signals is relatively long, it is still possible to detect how fast the preferred beam changes without missing the chance for the network device to get aware of possible increase of speed of the terminal device. In this way, deterioration of communication quality due to lack of necessary channel measurement will be avoided.

Figure 8:
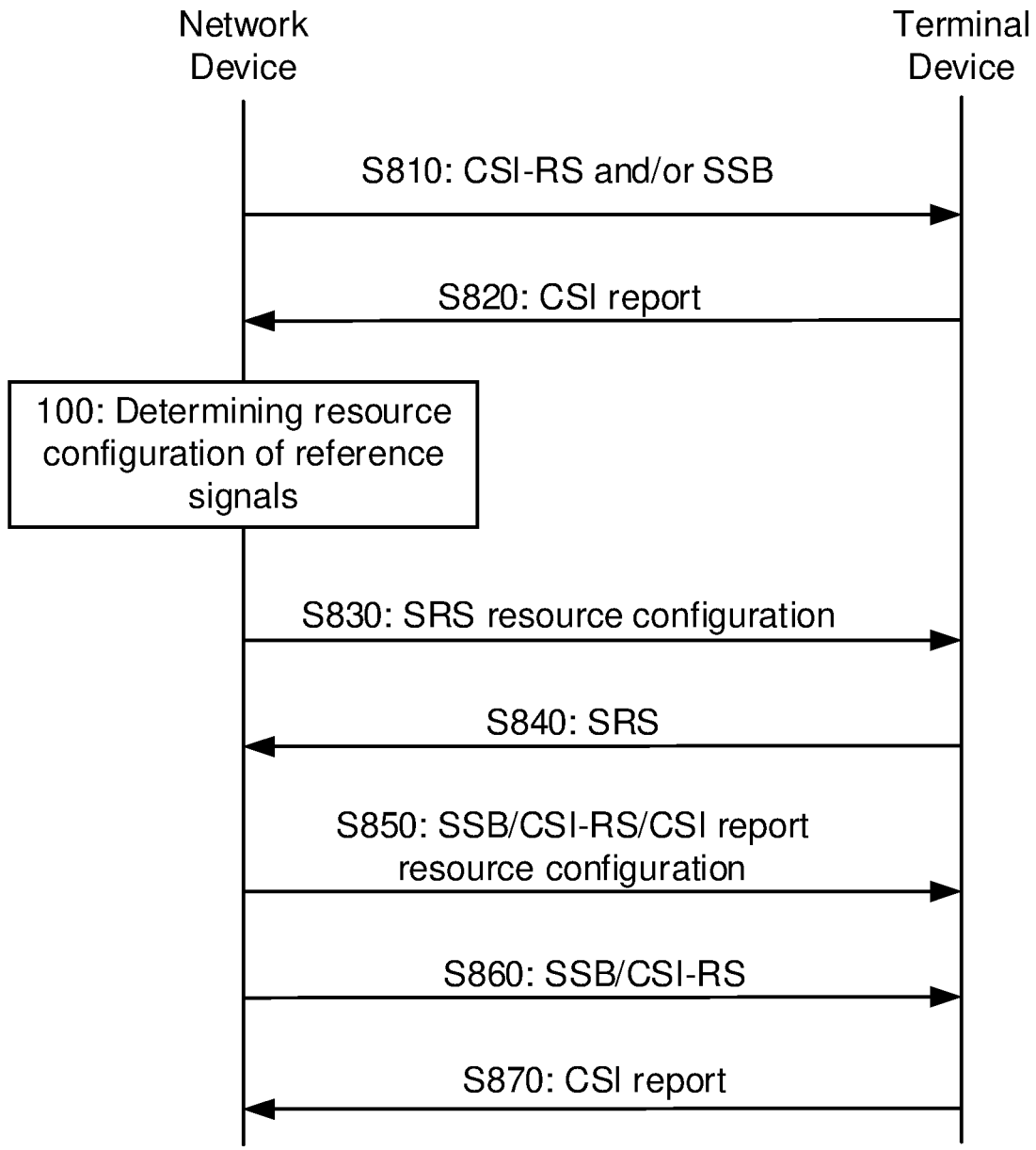
FIG. 8 is a flowchart illustrating an exemplary process in which the resource configuration determination of the signals is applied according to an embodiment of the present disclosure.

FIG. 8 is a flowchart illustrating an exemplary process in which the resource configuration determination of the signals is applied according to an embodiment of the present disclosure.

As shown in FIG. 8, the exemplary process may comprise the following steps. At step S810, the network device transmits a CSI-RS signal and/or SSB signal to the terminal device. At step S820, the terminal device transmits a CSI report to the network device. The CSI report may include the beam information as described in the above. The beam information may comprise beam indexes of the preferred beams. Steps S810 and S820 may be performed for a plurality cycles so that a plurality of beam management procedures may be performed. Then the network device may perform the method 100 shown in FIG. 1, in which speed information of the terminal device is determined, and the resource configuration of the reference signals and related reports is determined based on the speed information.

The reference signals and related reports may comprise uplink signals, including at least one of an SRS signal and a CSI report. The reference signals and related reports may also comprise downlink signals, including at least one of an SSB signal and a CSI-RS signal.

For the SRS signal, in step S830, the network device may transmit to the terminal device the SRS resource configuration determined in the method 100 so that the terminal device may know whether and when to transmit the SRS signal. In step S840, the terminal device transmits the SRS signal to the network device according to the resource configuration received from the network device.

For other signals, in step S850, the network device may transmit to the terminal device the resource configuration of the CSI report determined in the method 100. Optionally and alternatively, in step S850, the network device may transmit the resource configuration of the SSB or CSI-RS signal determined in the method 100 to the terminal device. In step S860, the network device may transmit the SSB or CSI-RS signal to the network device according to the resource configuration determined in method 100. In step S870, the terminal device may transmit the CSI report to the network device in response to the SSB or CSI-RS signal according to the resource configuration received from the network device. Although FIG. 8 shows the SRS is used as an uplink reference signal, it is also possible to use SRS as a downlink reference signal, for example, if DL reciprocity transmission is performed.

Figure 9:
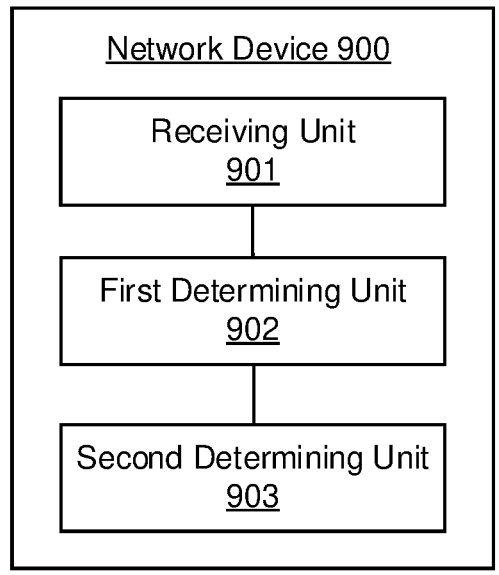
FIG. 9 is a block diagram of a network device according to an embodiment of the present disclosure.

Correspondingly to the method 100 as described above, a network device can be provided. FIG. 9 is a block diagram of a network device 900 according to an embodiment of the present disclosure. The network device 900 can be, for example, an eNB or gNB.

As shown in FIG. 9, the network device 900 includes a receiving unit 901 configured to receive beam information obtained in a plurality of beam management procedures. The beam information may comprise information on a plurality of preferred beams of the network device determined by the terminal device in the plurality of beam management procedures. The network device 900 further includes a first determining unit 902 configured to determine speed information of the terminal device based on the beam information obtained in the plurality of beam management procedures. The network device 900 further includes a second determining unit 903 configured to determine a resource configuration of a signal based on the speed information of the terminal device. The signal may be a reference signal or a report signal.

In an embodiment, the speed information may be based on distance information between the plurality of preferred beams.

In an embodiment, the distance information between the plurality of preferred beams may be obtained by: determining a plurality of distances, the plurality of distances include beam distances each being a distance between a respective pair of preferred beams obtained in different beam management procedures, and determining a maximum or an average of the plurality of distances as the distance information.

In an embodiment, if a beam distance between a pair of preferred beams is not larger than a predetermined distance, the beam distance between the pair of preferred beams may be determined to be zero.

In an embodiment, the plurality of distances may further include a group distance between a first group of preferred beams determined in a first beam management procedure and a second group of preferred beams determined in a second beam management procedure. The group distance may be a beam distance between one preferred beam of the first group and one preferred beam of the second group.

In an embodiment, the group distance may be a maximum of beam distances between preferred beams of the first group and preferred beams of the second group; or the group distance may be a beam distance between a best beam of the first group and a best beam of the second group.

In an embodiment, the beam distance between the respective pair of preferred beams may be a number of beams between centers of the preferred beams of the pair.

In an embodiment, the beam distance between the respective pair of preferred beams may be an angle encompassed between centers of the preferred beams of the pair.

In an embodiment, each of the plurality of distances may be a distance normalized by a time interval between preferred beams of the respective beam management procedures.

In an embodiment, the second determination unit may be configured to perform at least one of the following: allocating a resource to the signal, allocating no resource to the signal, reallocating a resource to the signal; and changing a period for the signal.

In an embodiment, the second determination unit may comprise an allocating unit configured to allocate a resource to the signal if the speed information is smaller than a first threshold, or allocate no resource to the signal if the speed information is not smaller than the first threshold.

In an embodiment, the signal may comprise an SRS used for uplink code-book-based transmission. In addition, the second determination unit may comprise an allocating unit configured to allocate a resource to the signal if the speed information is smaller than a first threshold and a channel quality is larger than a quality threshold, or allocate no resource to the signal if the speed information is smaller than the first threshold and the channel quality is not larger than the quality threshold.

In an embodiment, the allocation unit may comprise a releasing unit configured to release a resource already allocated to the signal.

In an embodiment, the network device may further comprise a first setting unit configured to, in a case where the signal is intended for use with downlink channel reciprocity, set a downlink transmission mode to a non-reciprocity transmission mode in response to allocating no resource to the signal.

In an embodiment, the network device may further comprise a second setting unit configured to, in a case where the signal is intended for use with uplink transmission, set an uplink transmission mode to a transmission mode which is not based on the signal in response to allocating no resource to the signal.

In an embodiment, the allocation unit may comprise: a setting unit configured to set a first period for the signal if the speed information is smaller than a second threshold which is smaller than the first threshold, or set a second period which is smaller than the first period for the signal if the speed information is not smaller than the second threshold and smaller than the first threshold.

In an embodiment, the network device may further comprise a period changing unit configured to decrease the period for the signal from a first period to a second period which is smaller than the first period in response to determination that the speed information increases to become not smaller than a second threshold, or increase the period for the signal from the second period to the first period in response to determination that the speed information decreases to become smaller than the second threshold.

In an embodiment, the network device may further comprise a reallocating unit configured to reallocate a resource to the signal in response to determination that the speed information increases to become not smaller than a second threshold or in response to determination that the speed information decreases to become smaller than the second threshold.

In an embodiment, the network device may further comprise a configuring unit configured to configure a detection signal between two successive signals if the period for the signal is larger than a period threshold.

In an embodiment, the network device may further comprise a first transmitting unit configured to transmit CSI-RSs and/or SSBs to the terminal device. The network device may further comprise a second receiving unit configured to receive respective CSI reports from the terminal device, wherein the beam information comprises beam indexes of the plurality of preferred beams included in the respective CSI reports. The network device may further comprise a second transmitting unit configured to transmit the determined resource configuration of the signal to the terminal device. The network device may further comprise a third receiving unit configured to receive the signal transmitted from the terminal device according to the resource configuration of the signal. The signal may comprise at least one of an SRS and a CSI report.

In an embodiment, the network device may further comprise a first transmitting unit configured to transmit CSI-RSs and/or SSBs to the terminal device. The network device may further comprise a second receiving unit configured to receive respective CSI reports from the terminal device, wherein the beam information comprises beam indexes of the plurality of preferred beams included in the respective CSI reports. The network device may further comprise a second transmitting unit configured to transmit the signal to the terminal device according to the determined resource configuration of the signal. The signal may comprise an SRS and an SSB.

The receiving unit 901, the first determining unit 902, the second determining unit 903 and other various units can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 1.

Figure 10:
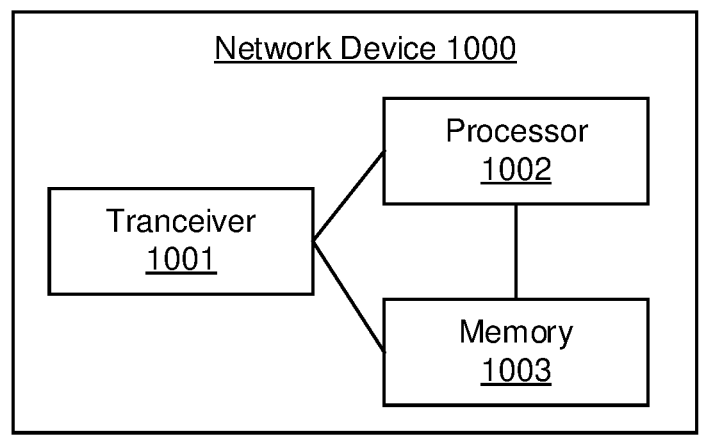
FIG. 10 is a block diagram of a network device according to another embodiment of the present disclosure.

FIG. 10 is a block diagram of a network device 1000 according to another embodiment of the present disclosure.

The network device 1000 includes a transceiver 1001, a processor 1002 and a memory 1003. The memory 1003 contains instructions executable by the processor 1002 whereby the network device 1000 is operative to perform the actions, e.g., of the procedure described earlier in conjunction with FIG. 1. Particularly, the memory 1003 contains instructions executable by the processor 1002 whereby the network device 1000 is operative to: receiving beam information obtained in a plurality of beam management procedures, the beam information comprising information on a plurality of preferred beams of the network device determined by the terminal device in the plurality of beam management procedures; determining speed information of the terminal device based on the beam information obtained in the plurality of beam management procedures; and determining a resource configuration of a signal based on the speed information of the terminal device, the signal being a reference signal or a report signal.

In some embodiments, the memory 1003 may further contain instructions executable by the processor 1002 whereby the network device 1000 is operative to perform any of the aforementioned methods, steps, and processes.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 1002 causes the network device 1000 to perform the actions, e.g., of the procedure described earlier in conjunction with FIG. 1.

The computer program product may be configured as a computer program code structured in computer program modules. The computer program modules could essentially perform the actions of the flow illustrated in FIG. 1.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

Figure 11:
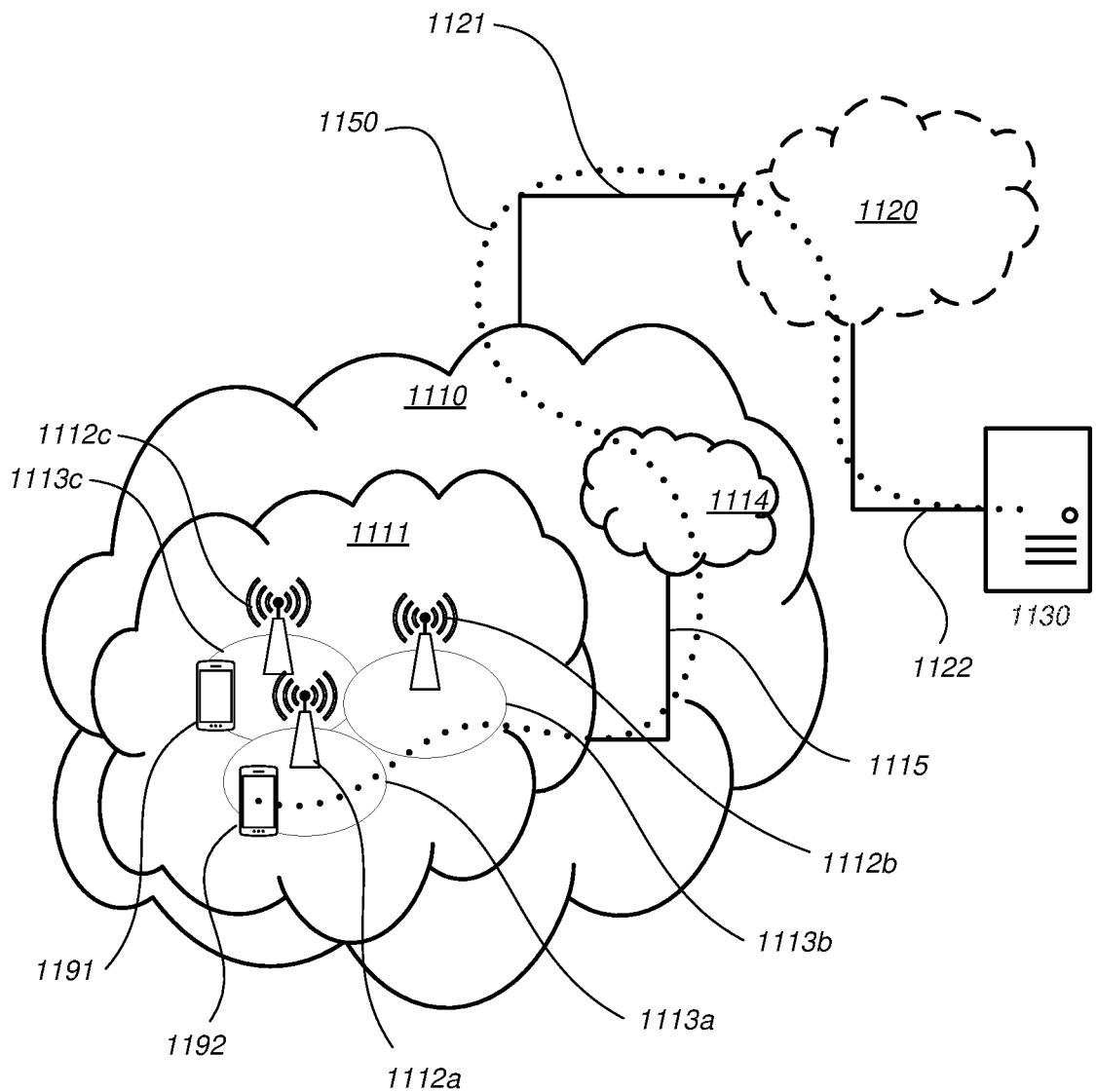
FIG. 11 schematically illustrates a telecommunication network connected via an intermediate network to a host computer.

With reference to FIG. 11, in accordance with an embodiment, a communication system includes a telecommunication network 1110, such as a 3GPP-type cellular network, which comprises an access network 1111, such as a radio access network, and a core network 1114. The access network 1111 comprises a plurality of base stations 1112a, 1112b, 1112c, such as NBs, eNBs, gNBs or other types of wireless access points, each defining a corresponding coverage area 1113a, 1113b, 1113c. Each base station 1112a, 1112b, 1112c is connectable to the core network 1114 over a wired or wireless connection 1115. A first user equipment (UE) 1191 located in coverage area 1113c is configured to wirelessly connect to, or be paged by, the corresponding base station 1112c. A second UE 1192 in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the corresponding base station 1112.

The telecommunication network 1110 is itself connected to a host computer 1130, which may be embodied in the hardware and/or software of a standalone server, a cloud-implemented server, a distributed server or as processing resources in a server farm. The host computer 1130 may be under the ownership or control of a service provider, or may be operated by the service provider or on behalf of the service provider. The connections 1121, 1122 between the telecommunication network 1110 and the host computer 1130 may extend directly from the core network 1114 to the host computer 1130 or may go via an optional intermediate network 1120. The intermediate network 1120 may be one of, or a combination of more than one of, a public, private or hosted network; the intermediate network 1120, if any, may be a backbone network or the Internet; in particular, the intermediate network 1120 may comprise two or more sub-networks (not shown).

The communication system of FIG. 11 as a whole enables connectivity between one of the connected UEs 1191, 1192 and the host computer 1130. The connectivity may be described as an over-the-top (OTT) connection 1150. The host computer 1130 and the connected UEs 1191, 1192 are configured to communicate data and/or signaling via the OTT connection 1150, using the access network 1111, the core network 1114, any intermediate network 1120 and possible further infrastructure (not shown) as intermediaries. The OTT connection 1150 may be transparent in the sense that the participating communication devices through which the OTT connection 1150 passes are unaware of routing of uplink and downlink communications. For example, a base station 1112 may not or need not be informed about the past routing of an incoming downlink communication with data originating from a host computer 1130 to be forwarded (e.g., handed over) to a connected UE 1191. Similarly, the base station 1112 need not be aware of the future routing of an outgoing uplink communication originating from the UE 1191 towards the host computer 1130.

Example implementations, in accordance with an embodiment, of the UE, base station and host computer discussed in the preceding paragraphs will now be described with reference to FIG. 12. In a communication system 1200, a host computer 1210 comprises hardware 1215 including a communication interface 1216 configured to set up and maintain a wired or wireless connection with an interface of a different communication device of the communication system 1200. The host computer 1210 further comprises processing circuitry 1218, which may have storage and/or processing capabilities. In particular, the processing circuitry 1218 may comprise one or more programmable processors, application-specific integrated circuits, field programmable gate arrays or combinations of these (not shown) adapted to execute instructions. The host computer 1210 further comprises software 1211, which is stored in or accessible by the host computer 1210 and executable by the processing circuitry 1218. The software 1211 includes a host application 1212. The host application 1212 may be operable to provide a service to a remote user, such as a UE 1230 connecting via an OTT connection 1250 terminating at the UE 1230 and the host computer 1210. In providing the service to the remote user, the host application 1212 may provide user data which is transmitted using the OTT connection 1250.

The communication system 1200 further includes a base station 1220 provided in a telecommunication system and comprising hardware 1225 enabling it to communicate with the host computer 1210 and with the UE 1230. The hardware 1225 may include a communication interface 1226 for setting up and maintaining a wired or wireless connection with an interface of a different communication device of the communication system 1200, as well as a radio interface 1227 for setting up and maintaining at least a wireless connection 1270 with a UE 1230 located in a coverage area (not shown in FIG. 12) served by the base station 1220. The communication interface 1226 may be configured to facilitate a connection 1250 to the host computer 1210. The connection 1250 may be direct or it may pass through a core network (not shown in FIG. 12) of the telecommunication system and/or through one or more intermediate networks outside the telecommunication system. In the embodiment shown, the hardware 1225 of the base station 1220 further includes processing circuitry 1228, which may comprise one or more programmable processors, application-specific integrated circuits, field programmable gate arrays or combinations of these (not shown) adapted to execute instructions. The base station 1220 further has software 1221 stored internally or accessible via an external connection.

The communication system 1200 further includes the UE 1230 already referred to. Its hardware 1235 may include a radio interface 1237 configured to set up and maintain a wireless connection 1270 with a base station serving a coverage area in which the UE 1230 is currently located. The hardware 1235 of the UE 1230 further includes processing circuitry 1238, which may comprise one or more programmable processors, application-specific integrated circuits, field programmable gate arrays or combinations of these (not shown) adapted to execute instructions. The UE 1230 further comprises software 1231, which is stored in or accessible by the UE 1230 and executable by the processing circuitry 1238. The software 1231 includes a client application 1232. The client application 1232 may be operable to provide a service to a human or non-human user via the UE 1230, with the support of the host computer 1210. In the host computer 1210, an executing host application 1212 may communicate with the executing client application 1232 via the OTT connection 1250 terminating at the UE 1230 and the host computer 1210. In providing the service to the user, the client application 1232 may receive request data from the host application 1212 and provide user data in response to the request data. The OTT connection 1250 may transfer both the request data and the user data. The client application 1232 may interact with the user to generate the user data that it provides.

Figure 12:
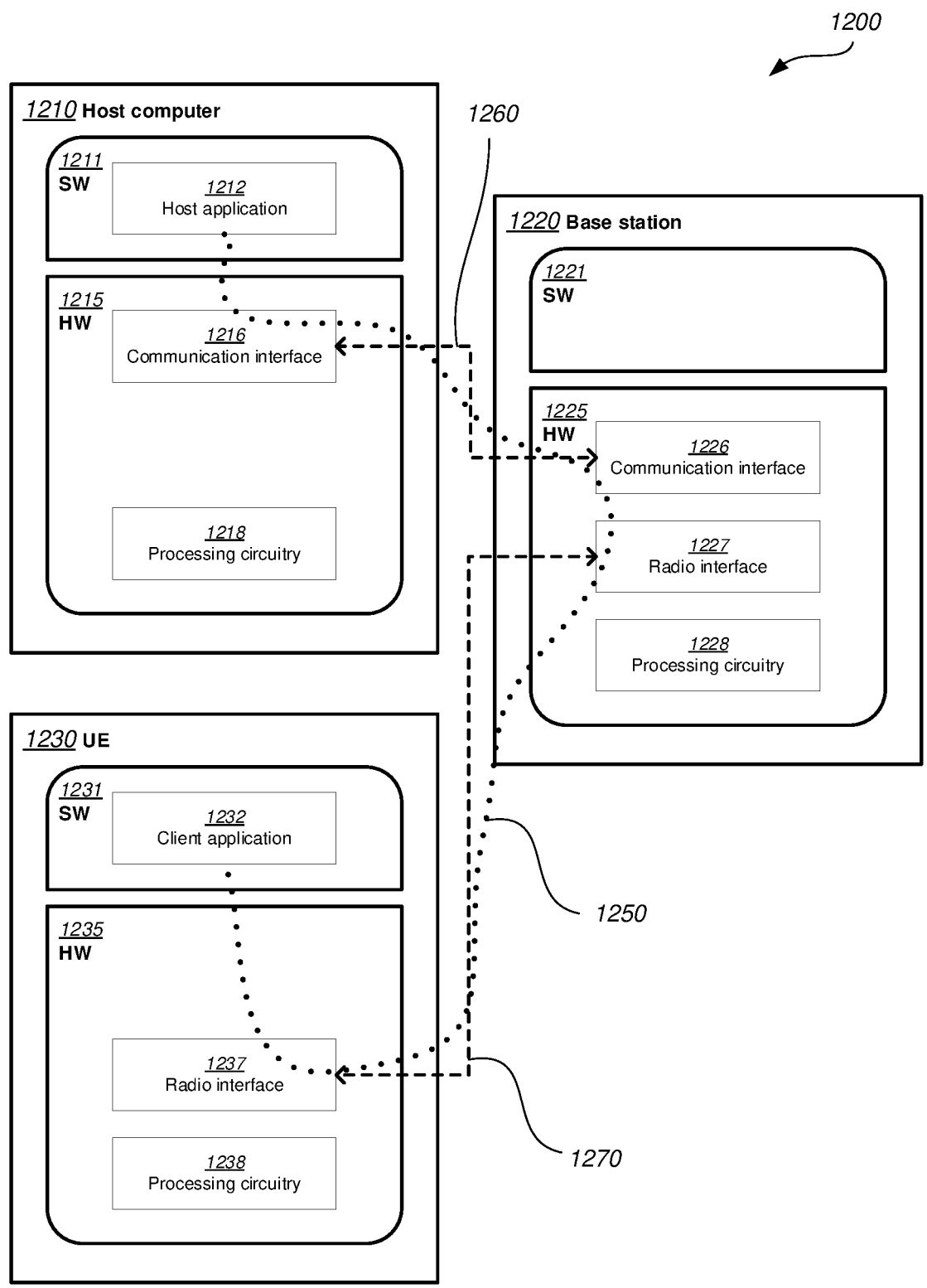
FIG. 12 is a generalized block diagram of a host computer communicating via a base station with a user equipment over a partially wireless connection.

It is noted that the host computer 1210, base station 1220 and UE 1230 illustrated in FIG. 12 may be identical to the host computer 530, one of the base stations 512a, 512b, 512c and one of the UEs 591, 592 of FIG. 11, respectively. This is to say, the inner workings of these entities may be as shown in FIG. 12 and independently, the surrounding network topology may be that of FIG. 11.

In FIG. 12, the OTT connection 1250 has been drawn abstractly to illustrate the communication between the host computer 1210 and the use equipment 1230 via the base station 1220, without explicit reference to any intermediary devices and the precise routing of messages via these devices. Network infrastructure may determine the routing, which it may be configured to hide from the UE 1230 or from the service provider operating the host computer 1210, or both. While the OTT connection 1250 is active, the network infrastructure may further take decisions by which it dynamically changes the routing (e.g., on the basis of load balancing consideration or reconfiguration of the network).

The wireless connection 1270 between the UE 1230 and the base station 1220 is in accordance with the teachings of the embodiments described throughout this disclosure. One or more of the various embodiments improve the performance of OTT services provided to the UE 1230 using the OTT connection 1250, in which the wireless connection 1270 forms the last segment. More precisely, the teachings of these embodiments may improve the data throughput and thereby provide benefits such as reduced user waiting time.

A measurement procedure may be provided for the purpose of monitoring data rate, latency and other factors on which the one or more embodiments improve. There may further be an optional network functionality for reconfiguring the OTT connection 1250 between the host computer 1210 and UE 1230, in response to variations in the measurement results. The measurement procedure and/or the network functionality for reconfiguring the OTT connection 1250 may be implemented in the software 1211 of the host computer 1210 or in the software 1231 of the UE 1230, or both. In embodiments, sensors (not shown) may be deployed in or in association with communication devices through which the OTT connection 1250 passes; the sensors may participate in the measurement procedure by supplying values of the monitored quantities exemplified above, or supplying values of other physical quantities from which software 1211, 1231 may compute or estimate the monitored quantities. The reconfiguring of the OTT connection 1250 may include message format, retransmission settings, preferred routing etc.; the reconfiguring need not affect the base station 1220, and it may be unknown or imperceptible to the base station 1220. Such procedures and functionalities may be known and practiced in the art. In certain embodiments, measurements may involve proprietary UE signaling facilitating the host computer's 1210 measurements of throughput, propagation times, latency and the like. The measurements may be implemented in that the software 1211, 1231 causes messages to be transmitted, in particular empty or 'dummy' messages, using the OTT connection 1250 while it monitors propagation times, errors etc.

Figures 13, 14:
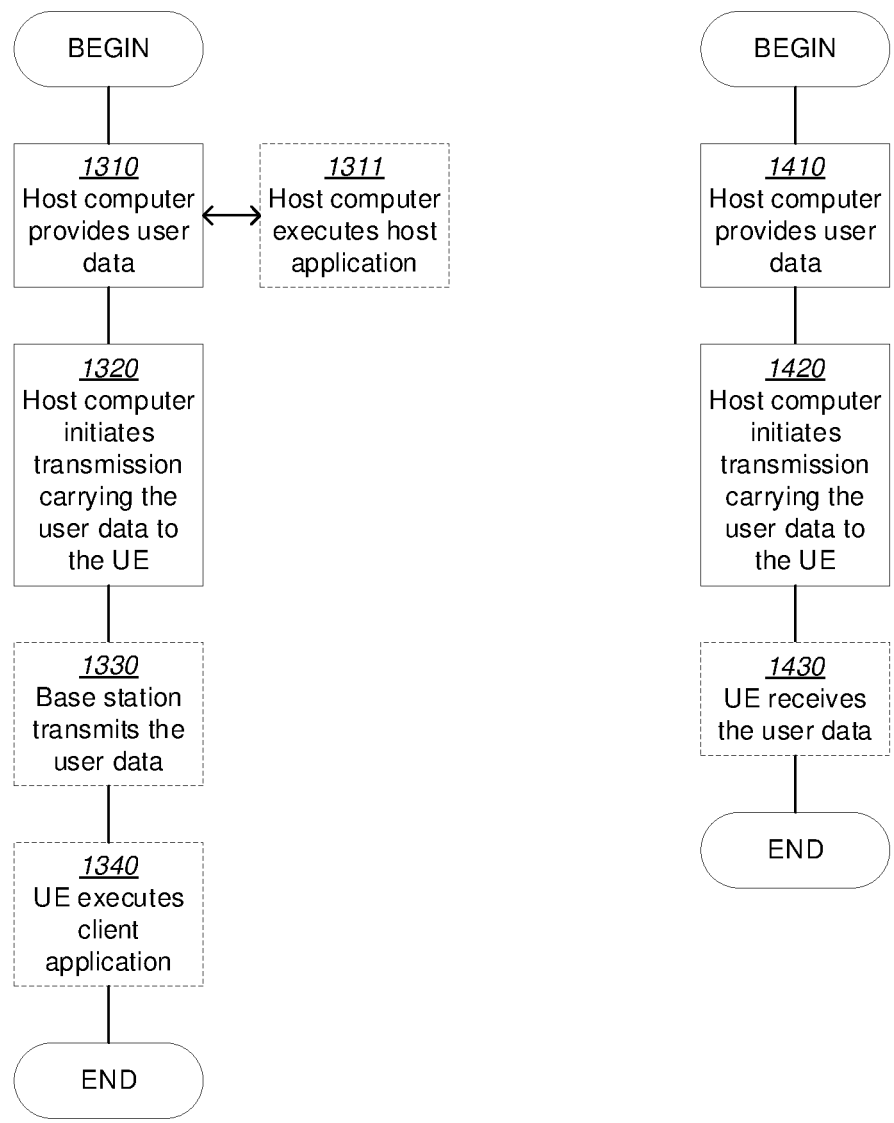
FIGS. 13 to 16 are flowcharts illustrating methods implemented in a communication system including a host computer, a base station and a user equipment.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In a first step 1310 of the method, the host computer provides user data. In an optional substep 1311 of the first step 1310, the host computer provides the user data by executing a host application. In a second step 1320, the host computer initiates a transmission carrying the user data to the UE. In an optional third step 1330, the base station transmits to the UE the user data which was carried in the transmission that the host computer initiated, in accordance with the teachings of the embodiments described throughout this disclosure. In an optional fourth step 1340, the UE executes a client application associated with the host application executed by the host computer.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In a first step 1410 of the method, the host computer provides user data. In an optional substep (not shown) the host computer provides the user data by executing a host application. In a second step 1420, the host computer initiates a transmission carrying the user data to the UE. The transmission may pass via the base station, in accordance with the teachings of the embodiments described throughout this disclosure. In an optional third step 1430, the UE receives the user data carried in the transmission.

Figures 15, 16:
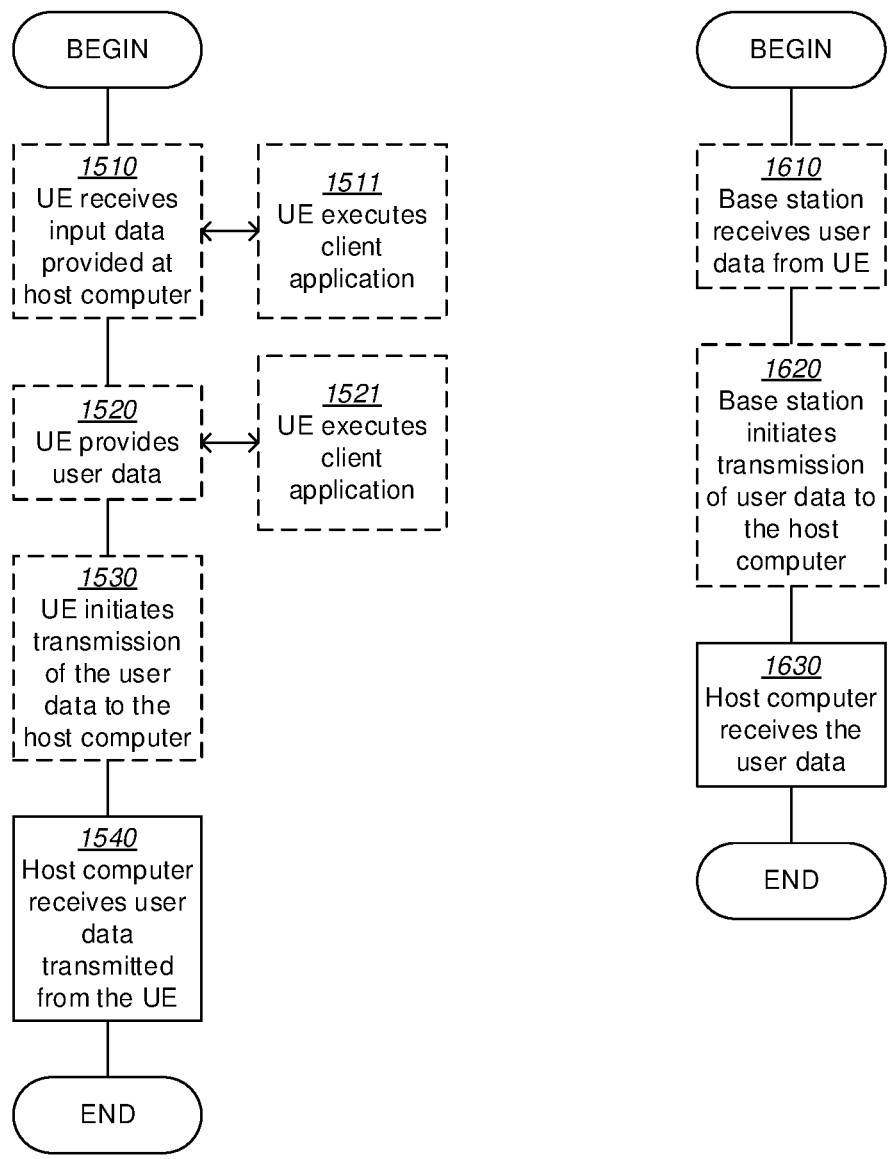

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In an optional first step 1510 of the method, the UE receives input data provided by the host computer. Additionally or alternatively, in an optional second step 1520, the UE provides user data. In an optional substep 1521 of the second step 1520, the UE provides the user data by executing a client application. In a further optional substep 1511 of the first step 1510, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1530, transmission of the user data to the host computer. In a fourth step 1540 of the method, the host computer receives the user data transmitted from the UE, in accordance with the teachings of the embodiments described throughout this disclosure.

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In an optional first step 1610 of the method, in accordance with the teachings of the embodiments described throughout this disclosure, the base station receives user data from the UE. In an optional second step 1620, the base station initiates transmission of the received user data to the host computer. In a third step 1630, the host computer receives the user data carried in the transmission initiated by the base station.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method at a network device, comprising:
receiving beam information obtained in a plurality of beam management procedures, the beam information comprising information on a plurality of preferred beams of the network device determined by a terminal device in the plurality of beam management procedures;
determining speed information of the terminal device based on the beam information; and
determining a resource configuration of a signal based on the speed information of the terminal device, the signal being a reference signal or a report signal,
wherein the speed information is based on distance information between the plurality of preferred beams, and wherein the distance information between the plurality of preferred beams is obtained by:
determining a plurality of distances, the plurality of distances including beam distances each being a distance between a respective pair of preferred beams obtained in different beam management procedures; and
determining a maximum or an average of the plurality of distances as the distance information.

2. The method of claim 1, wherein, if a beam distance between a pair of preferred beams is not larger than a predetermined distance, the beam distance between the pair of preferred beams is determined to be zero.

3. The method of claim 1, wherein the plurality of distances include a group distance between a first group of preferred beams determined in a first beam management procedure and a second group of preferred beams determined in a second beam management procedure, the group distance being a beam distance between one preferred beam of the first group and one preferred beam of the second group.

4. The method of claim 3, wherein:
the group distance is a maximum of beam distances between preferred beams of the first group and preferred beams of the second group; or
the group distance is a beam distance between a best beam of the preferred beams of the first group and a best beam of the preferred beams of the second group.

5. The method of claim 1, wherein the beam distance between the respective pair of preferred beams is determined to be a number of beams between centers of the preferred beams of the pair.

6. The method of claim 1, wherein the beam distance between the respective pair of preferred beams is determined to be an angle encompassed between centers of the preferred beams of the pair.

7. The method of claim 1, wherein each of the plurality of distances is a distance normalized by a time interval between preferred beams of the respective beam management procedures.

8. The method of claim 1, wherein the determining the resource configuration based on the speed information of the terminal device comprises:
allocating a resource to the signal;
allocating no resource to the signal;
reallocating a resource to the signal; or
changing a period for the signal.

9. The method of claim 8, wherein the allocating no resource to the signal comprises releasing a resource already allocated to the signal.

10. The method of claim 8, wherein the method further comprises:
in a case where the signal is intended for use with downlink channel reciprocity, setting a downlink transmission mode to a non-reciprocity transmission mode in response to allocating no resource to the signal; or
in a case where the signal is intended for use with uplink transmission, setting an uplink transmission mode to a transmission mode which is not based on the signal in response to allocating no resource to the signal.

11. The method of claim 8:
wherein the changing a period for the signal comprises:
decreasing the period for the signal from a first period to a second period which is smaller than the first period in response to determination that the speed information increases to become not smaller than a second threshold; or
increasing the period for the signal from the second period to the first period in response to determination that the speed information decreases to become smaller than the second threshold; or
wherein the reallocating the resource to the signal comprises reallocating a resource to the signal in response to determination that the speed information increases to become not smaller than the second threshold or in response to determination that the speed information decreases to become smaller than the second threshold.

12. The method of claim 1, wherein the determining the resource configuration based on the speed information of the terminal device comprises:
allocating a resource to the signal if the speed information is smaller than a first threshold; or
allocating no resource to the signal if the speed information is not smaller than the first threshold.

13. The method of claim 12, wherein the allocating the resource to the signal if the speed information is smaller than a first threshold comprises:
setting a first period for the signal if the speed information is smaller than a second threshold which is smaller than the first threshold; or
setting a second period which is smaller than the first period for the signal if the speed information is not smaller than the second threshold and smaller than the first threshold.

14. The method of claim 13, further comprising configuring a detection signal between two successive signals if the period for the signal is larger than a period threshold.

15. The method of claim 1:
wherein the signal comprises a Sounding Reference Signal (SRS) used for uplink code-book-based transmission;
wherein the determining the resource configuration based on the speed information of the terminal device comprises:
- allocating a resource to the signal if the speed information is smaller than a first threshold and a channel quality is larger than a quality threshold; or
- allocating no resource to the signal if the speed information is smaller than the first threshold and the channel quality is not larger than the quality threshold.

16. The method of claim 1, further comprising:
transmitting Channel State Information (CSI)-Reference Signals (CSI-RSs) or Synchronization Signal Blocks (SSBs) to the terminal device;
receiving respective CSI reports from the terminal device;
wherein the beam information comprises beam indexes of the plurality of preferred beams included in the respective CSI reports;
transmitting the determined resource configuration of the signal to the terminal device;
receiving the signal transmitted from the terminal device according to the resource configuration of the signal;
wherein the signal comprises a Sounding Reference Signal (SRS) and/or or a CSI report.

17. The method of claim 1, further comprising:
transmitting Channel State Information (CSI)-Reference Signals (CSI-RSs) and/or or Synchronization Signal Blocks (SSBs) to the terminal device;
receiving respective CSI reports from the terminal device;
wherein the beam information comprises beam indexes of the plurality of preferred beams included in the respective CSI reports;
transmitting the signal to the terminal device according to the determined resource configuration of the signal, wherein the signal comprises a CSI-RS, a Sounding Reference Signal (SRS), or an SSB.

18. A network device, comprising:
a transceiver;
processing circuitry;
memory containing instructions executable by the processing circuitry whereby the network device is operative to:
- receive beam information obtained in a plurality of beam management procedures, the beam information comprising information on a plurality of preferred beams of the network device determined by a terminal device in the plurality of beam management procedures;
- determine speed information of the terminal device based on the beam information; and
- determine a resource configuration of a signal based on the speed information of the terminal device, the signal being a reference signal or a report signal,
wherein the speed information is based on distance information between the plurality of preferred beams, and
wherein the distance information between the plurality of preferred beams is obtained by:
- determining a plurality of distances, the plurality of distances including beam distances each being a distance between a respective pair of preferred beams obtained in different beam management procedures; and
- determining a maximum or an average of the plurality of distances as the distance information.

* * * * *